United States Patent [19]
Kittler

[11] Patent Number: 5,318,609
[45] Date of Patent: Jun. 7, 1994

[54] SEPARATOR FOR LIQUIDS IN A STREAM OF GAS, IN PARTICULAR FOR OIL MIST

[75] Inventor: Helmut Kittler, Biebergemünd-Neuwirtheim, Fed. Rep. of Germany

[73] Assignee: Rentschler Reven-Luftungssysteme GmbH, Sersheim, Fed. Rep. of Germany

[21] Appl. No.: 30,775

[22] Filed: Mar. 12, 1993

[51] Int. Cl.$^5$ ............................................. B01D 45/00
[52] U.S. Cl. ................................... 55/443; 55/445; 55/257.3
[58] Field of Search ................ 55/442, 443, 444, 445, 55/446, 257.3

[56] References Cited

U.S. PATENT DOCUMENTS

| | | | |
|---|---|---|---|
| 4,175,935 | 11/1979 | Gubermuth et al. | 55/443 |
| 4,545,792 | 10/1985 | Hüttlin | 55/443 |
| 4,877,430 | 10/1989 | Gutermuth | 55/446 |

FOREIGN PATENT DOCUMENTS

| | | |
|---|---|---|
| 148289 | 7/1985 | European Pat. Off. . |
| 1122498 | 1/1962 | Fed. Rep. of Germany . |
| 9005858 | 7/1990 | Fed. Rep. of Germany . |
| 9013468 | 2/1991 | Fed. Rep. of Germany . |
| 2120471 | 8/1972 | France . |
| 2388532 | 11/1982 | France . |

*Primary Examiner*—Robert J. Warden
*Assistant Examiner*—Hien Tran
*Attorney, Agent, or Firm*—Barry R. Lipsitz

[57] ABSTRACT

A plate separator, with a transverse throughflow for separating liquids such as an oil mist out of a stream of gas, is disclosed. A plurality of pairs of curved deflecting surfaces are provided. The deflecting surfaces are located opposite one another with their concave sides laterally offset. A stream of air to be cleaned flows along these surfaces one after the other. The deflecting surfaces form turbulence chambers between them. Each chamber has an inlet gap and an outlet gap. The inflow-side deflecting surface of each chamber has a curvature that increases in the direction of flow.

32 Claims, 2 Drawing Sheets

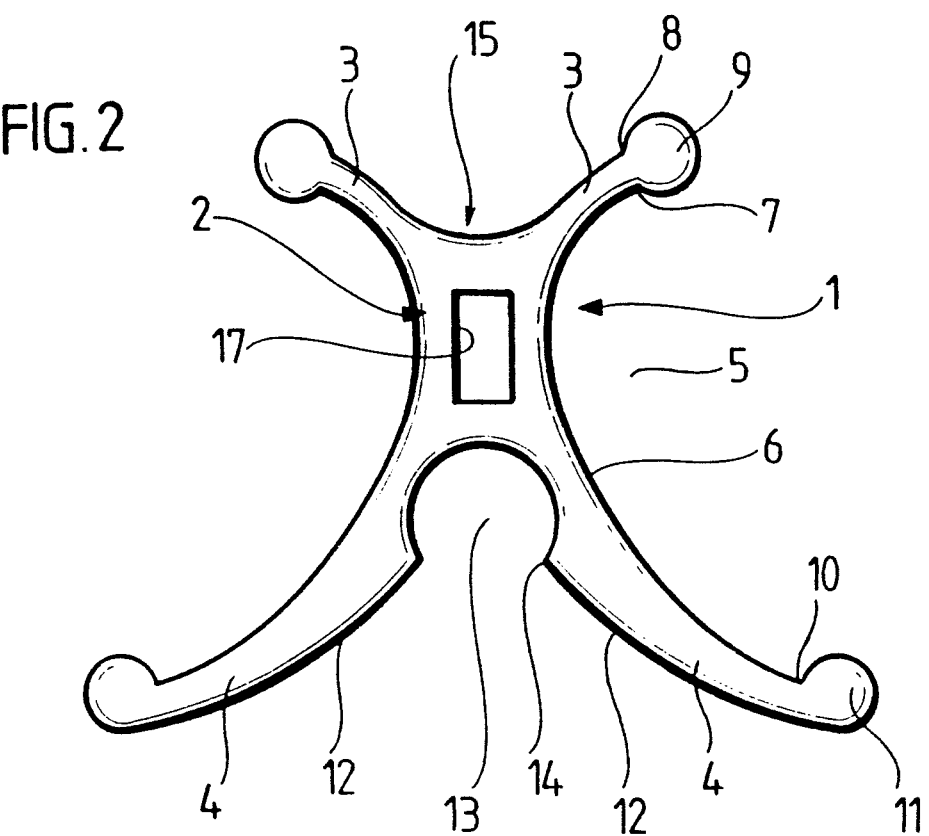
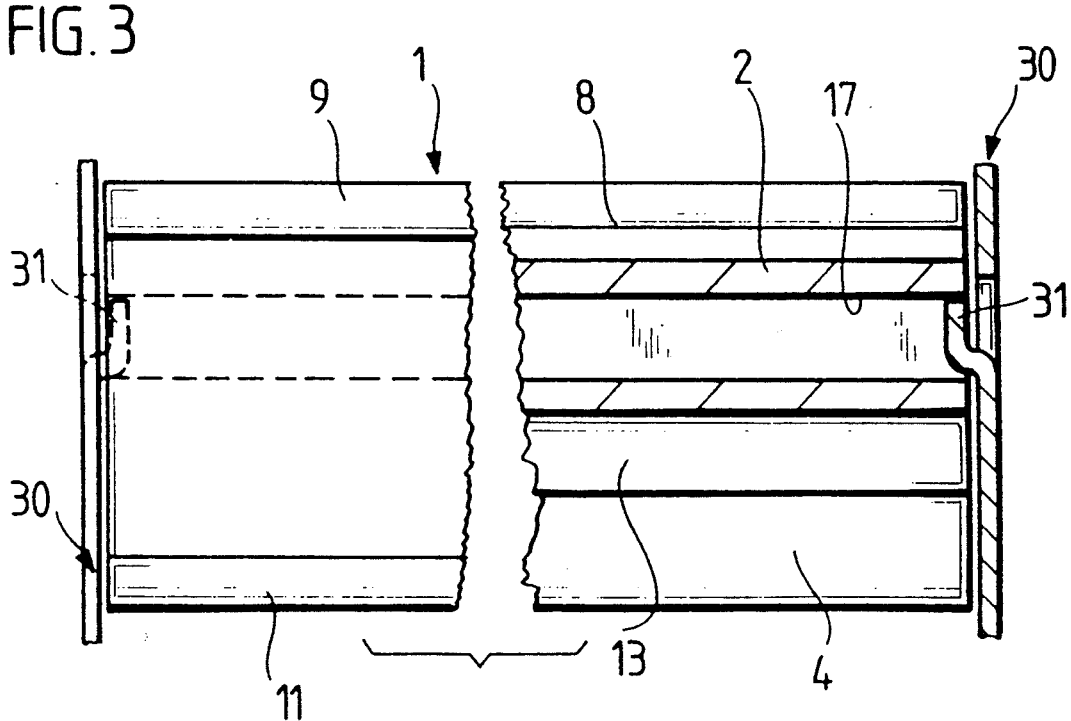

SEPARATOR FOR LIQUIDS IN A STREAM OF GAS, IN PARTICULAR FOR OIL MIST

BACKGROUND OF THE INVENTION

The invention relates to a plate-like separator with a transverse throughflow for separating liquids out of a stream of gas, in particular oil mist, comprising a plurality of pairs of curved deflecting surfaces located opposite one another with their concave sides so as to be laterally offset, a stream of air to be cleaned flowing along these surfaces one after the other, whereby the deflecting surfaces form between them a turbulence chamber having an inlet gap and an outlet gap and the inflow-side deflecting surface has a curvature increasing in the direction of flow.

Separators of this type are known, for example, from French laid-open paper 2 388 532. In this case, a large number of profiles which are, in cross section, shaped like a circular arc and extend, for example, over three quarters of a circle, are located opposite one another with their open sides and are laterally offset such that the portions near the edges of the facing profiles form between them a narrow turbulence chamber. A stream of air entering an open profile is deflected in this and introduced into such a turbulence chamber. This means that due to the deflection, on the one hand, and the changes in velocity due to alterations in cross section, on the other hand, the liquid particles carried along in the stream of air are caused to separate out so that the stream of air subsequently exits from the separator again in a cleaned state in a direction parallel to the original direction of entry. A separator with this type of construction has the advantage that it has a low overall height since the overall height results from the two channel-like profiles located opposite one another. However, the degree of separation is not adequate for all requirements.

In a further, known separator (German Utility Model 90 05 858), special turbulence chambers are provided which are intended to guarantee a crossover air flow guidance. For this reason, pairs of oppositely located deflecting surfaces are designed such that they both have an increasing curvature in the same direction, i.e. in the throughflow direction of the turbulence chamber. The bowls formed by the deflecting surfaces do not open towards one another and so opposite deflecting surfaces do not form a common turbulence chamber but two turbulence chambers which are arranged next to one another and into which the stream of air enters one after the other.

SUMMARY OF THE INVENTION

The object of the invention is to develop a separator of the generic type further so that an improved separation can be achieved.

This object is accomplished in accordance with the invention, for a separator of the type described at the outset, in that the outflow-side deflecting surface has a curvature decreasing in the direction of flow and that the inflow-side and outflow-side deflecting surfaces forming the turbulence chamber are offset relative to one another by a maximum of half the width of a deflecting surface in the plane defined by their respective edges.

As a result of this design, the two deflecting surfaces pointing towards one another form between them a single turbulence chamber, whereby the curvature of the two deflecting surfaces increases in opposite directions so that the more curved regions of each enclose the turbulence chamber while the less curved regions form the inlet and outlet, respectively, of the turbulence chamber. Altogether, the turbulence chamber is therefore given a cyclone-type configuration which differs fundamentally from a known arrangement such as that described, for example, in the German Utility Model 90 05 858.

It has been found that this special cyclone-type design of the turbulence chamber, which has a large area due to the opposite arrangement of the deflecting surfaces and the relatively slight offset of the deflecting surfaces relative to one another, results, on the one hand, in a very compact configuration of the separator and, on the other hand, in an extremely good degree of separation. The increasing curvature of the inflow-side deflecting surface leads to a considerable change in the direction of flow of the particles and an increase in their velocity. This promotes separation.

In this respect, it is an advantageous development for the curvature of the portion of the inflow-side deflecting surface located downstream to be in the shape of a circular arc and/or for the curvature of the portion of the outflow-side deflecting surface located upstream to be in the shape of a circular arc. This means that the turbulence chamber is enlarged and so in the interior of the turbulence chamber a particularly large alteration in the velocity of the stream of gas occurs due to an increased cross section.

It is, in particular, favorable for the turbulence chamber enclosed by the deflecting surfaces to have essentially a circular cross section since this favors the formation of turbulence in the turbulence chamber.

In this respect, it is possible for the diameter of the turbulence chamber to be four to six times as large as the width of the inlet gap between the inflow-side deflecting surface and the edge of the outflow-side deflecting surface. This leads to a considerable enlargement of the cross section once the flow has entered the turbulence chamber and, therefore, to a considerable decrease in the flow velocity, which again results in a particularly effective separation.

In a preferred embodiment, the inflow-side deflecting surface limits with its inflow-side edge an inflow opening, through which the stream of air to be cleaned enters from the outside of the deflecting surface essentially at right angles to the adjacent portion of the inflow-side deflecting surface. The stream of air to be cleaned is therefore diverted through at least 90° after passing through the inflow opening and is not guided into the turbulence chamber by the inflow-side deflecting surface until after this diversion. This diversion of the stream of air through at least 90° prior to reaching the deflecting surface results in a very effective preliminary separation of the liquid particles so that a reduced proportion of liquid enters the turbulence chamber itself.

It is possible for mirror-image pairs of inflow-side and outflow-side deflecting surfaces to be arranged next to one another and in mirror symmetry to the center axis of the stream of air entering through the inflow opening. The stream of air entering through the inflow opening is therefore divided into two opposite directions after passing through the inflow opening and reaches mirror-image turbulence chambers in the form of two partial streams after being deflected through at least 90° at the mirror-image inflow-side deflecting surfaces.

In this respect, it is favorable for the width of the inflow opening to be essentially twice as large as the width of the inlet gap into the turbulence chamber. As a result of this, the inflow velocity is essentially the same in the region of the inflow opening and in the region of the inlet gap.

The deflection of the stream of air entering through the inflow opening is facilitated by the fact that a concave baffle surface is arranged between the inflow-side edges of the outflow-side deflecting surfaces transversely to the inflow direction of the stream of air entering through the inflow opening. This baffle surface is preferably wider than the inflow opening. It limits, together with the inflow-side portions of the inflow-side deflecting surfaces, a turbulence area which is located prior to the turbulence chambers and acts as a preliminary separator.

It is possible to have baffle surfaces converging in the inflow direction arranged between adjacent inflow openings. A stream of air or gas impinging in this region will also be subject to separation of liquid particles due to this impact but the stream of gas cannot pass through the separator as a whole but will be thrown back into the space in front of the separator. In this way, a considerable proportion of the amount of gas to be cleaned is subjected to a preliminary cleaning before the stream of gas even passes through the inflow opening. In any case, the stream of gas impinging on the separator "sees" upon impact converging baffle surfaces, namely either in the form of the converging baffle surfaces arranged between the inflow openings or in the form of the concave baffle surfaces extending transversely over the inflow opening.

The baffle surfaces between the inflow openings can open into an expanded baffle chamber while forming a break-away edge. Such a break-away edge with subsequent expansion will also result, in this region, in a distinct increase in the separation of liquid particles.

In a further, preferred embodiment, the outflow-side edge of the outflow-side deflecting surface limits an outflow opening, through which the cleaned stream of gas exits to the outside essentially at right angles to the adjacent portion of the outflow-side deflecting surface. In this region, as well, a change in direction by at least 90° takes place and this results in a final, fine separation.

It is favorable for a turbulence area to be located in front of the outflow opening, this turbulence area being formed by the outflow-side ends of two outflow-side deflecting surfaces, which are arranged in mirror image to one another and form the outflow opening between them, and an end wall arranged between the outflow-side edges of the two associated inflow-side deflecting surfaces. In such a construction, streams of gas, which are exiting from a turbulence chamber and cleaned to a great extent, enter this turbulence area, each from an opposite side. These streams of gas impinge frontally on one another and are both deflected at right angles outwards in the direction towards the outflow opening. This leads, altogether, to a very effective final or fine separation which is based, on the one hand, on the deflection and, on the other hand, on the frontal impinging on one another of two oppositely directed streams of gas. In this respect, it is advantageous for the end wall to be concave in design towards the turbulence area so that the turbulence area is given, altogether, an approximately circular cross section.

The end wall is preferably wider than the outflow opening.

It is particularly favorable, in any case, for bead-like, break-away edges to be arranged at the inflow-side and outflow-side ends of the deflecting surfaces. These have, for example, a substantially circular cross section, whereby the diameter of these break-away edges is greater than the thickness of the wall forming a deflecting surface.

In this respect, it is favorable for the bead-like, break-away edges at the inflow-side edge of the outflow-side deflecting surface as well as at the outflow-side edge of the inflow-side deflecting surface to be arranged centrally so that a break-away edge is formed not only on the deflecting surface side but also on the outer side thereof, i.e. in the region of the baffle surface and the end wall, respectively.

On the other hand, it is favorable for the break-away edges adjacent the inflow opening and the outflow opening to be formed only on the inner side of the deflecting surfaces. This can be achieved in that the edge having a circular cross section merges at the outer side tangentially into the deflecting surface wall.

A particularly simple embodiment of a separator results when two adjacent mirror-image, inflow-side deflecting surfaces are connected with one another at their outer sides by a web. This provides a component which bears mirror-image deflecting surfaces on opposite sides.

In the same way, it is possible for two adjacent, mirror-image, outflow-side deflecting surfaces to be connected with one another at their outer sides by a web.

A particularly advantageous development of the separator is one, in which the components described above, each consisting of two deflecting surfaces, are of the same design and are turned through 180° and arranged so as to be offset laterally and in the inflow direction relative to one another. In this way, it is possible with a varying arrangement to obtain either inflow-side or outflow-side deflecting surfaces from a component which is of the same construction.

In this respect, it is particularly advantageous for the outer sides of the inflow-side deflecting surfaces to form in their less curved portions the baffle surfaces between adjacent inflow openings. In addition, it is possible for the outer sides of the deflecting surfaces to form in their more curved portions the baffle surface arranged transversely to the inflowing stream of air and the end wall limiting the turbulence area, respectively. In this way, the components bear not only the deflecting surfaces but also the baffle surfaces and end walls.

The simplest manner of producing such a separator is for the components consisting of two deflecting surfaces to be integral longitudinal profiles.

In a preferred embodiment, at least one channel-like opening can be arranged in the web of this component and a holding projection of a lateral frame member engages in this opening at the end faces of each component. This lateral frame member can, for example, be a plate, from which several tongues are punched out and these tongues are pressed inwardly into the channel-like openings of the adjacent profiles. In this way, it is possible to secure a greater number of profile webs in position between the side frame members in a permanent manner and in an exactly defined, relative arrangement.

The deflecting surfaces are preferably arranged in the separator such that the planes formed by the ends of a deflecting surface have an angle of between 20° and 60° relative to the inflow direction. In contrast to conventional separators, in which these planes are always at right angles to the inflow direction, the throughflow of such a separator is V-shaped and therefore saves accordingly on space in the plane extending transversely to the throughflow direction.

The deflecting surface directions differ from one another at the opposite ends of the deflecting surface by an angle of between 120° and 180°, i.e. the deflecting surfaces deflect the stream of gas guided along them through angles in the specified order of magnitude.

It is, in addition, advantageous for the inflow-side and outflow-side deflecting surfaces forming a turbulence chamber to be offset relative to one another by a maximum of half the width of a deflecting surface in the plane defined by their respective edges. This means that these deflecting surfaces face one another with at least half their width so that a turbulence chamber extending over at least half the width of the deflecting surfaces is formed. In contrast to conventional arrangements, in which the opposed profiles overlap one another only in the edge regions and in which these profiles are laterally offset relative to one another by almost the entire width of the profile, the increased overlapping of opposite profiles in the direction of the plane defined by their edges will create, on the one hand, a very large turbulence chamber which, on the other hand, is very effectively limited by the two deflecting surfaces. This promotes the separation.

A further increase in the degree of separation results in an embodiment which is characterized by the fact that the outflow-side deflecting surface and the inflow-side deflecting surface form an outlet gap at the outlet of the turbulence chamber and that each outlet gap opens into the turbulence area such that the stream of air exiting from it impinges frontally on a stream of air which enters the turbulence area through an oppositely located outlet gap of an adjacent turbulence chamber. The frontal impingement of the streams of air mixes these together and leads to a very effective separation of the residue liquid in the streams of gas.

The flow through the separator is V-shaped due to the inclined arrangement of the deflecting surfaces forming the turbulence chamber. This results in a small overall height for the separator, whereby the degree of separation is nevertheless at an optimum. Moreover, the flow resistance of the separator is particularly low due to this. The separator is advantageously composed of longitudinal profiles having an X-shaped cross section, the arms of the longitudinal profiles hereby forming the deflecting surfaces. The arms on one side of the longitudinal profile are preferably shorter than the arms on the other side.

BRIEF DESCRIPTION OF THE DRAWINGS

The following description of a preferred emodiment of the invention serves to explain the invention in greater detail in conjunction with the drawings. In the drawings:

FIG. 2 is an extruded profile in a cross-sectional view and

FIG. 3 is a schematic view of a separator with extruded profiles held between side frame members and comprising deflecting surfaces.

DETAILED DESCRIPTION OF THE INVENTION

Figure 1:
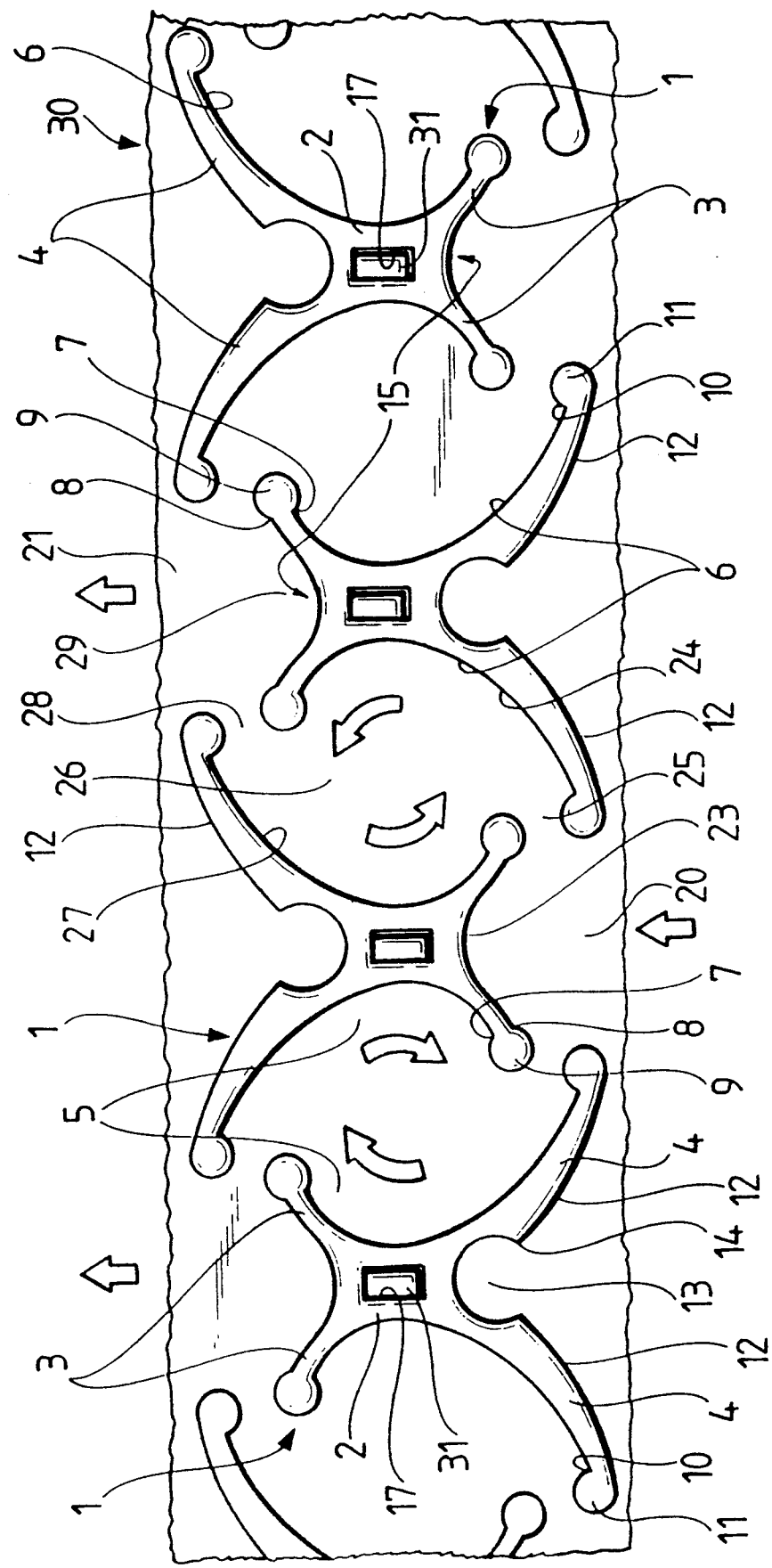
FIG. 1 is a cross-sectional view of a section of a separator with turbulence chambers arranged next to one another.

The separator illustrated in the drawings serves for separation of liquid droplets or vapor particles out of a stream of gas. In the following, the stream of gas is in some cases designated as well as a stream of air. However, it goes without saying that this separator can be used for separating any type of liquid from any type of gas.

The separator is essentially composed of a plurality of extruded profiles 1 which are arranged in a specific manner next to one another and in the illustrated embodiment are all of the same design. In the following, a single extruded profile will be described in detail on the basis of FIG. 2. This extruded profile can, for example, be a drawn aluminum profile.

An essentially parallelepiped central section, designated in the following as web 2, bears at each of its corners an arm 3, 4 inclined by an angle of about 45° relative to the center plane. The two arms 3, 4 are curved slightly towards one another in their length on one side of the center plane. The extruded profile is designed to be in mirror symmetry to the center plane. Altogether, an approximately X-shaped cross section results for the extruded profile, the arms 3 on one side being shorter than the arms 4 on the other side.

The side surfaces of the arms 3 and 4 facing one another and the side face of the web 2 enclosed between them together form a bowl 5 with an inner surface 6, the curvature of which increases from the longer arm 4 towards the shorter arm 3. In the end region of the shorter arm 3, the inner surface 6 can, in cross section, be in the shape of a circular arc; however, a continuous increase in the curvature can also be provided over the entire length of the inner surface 6.

The shorter arm 3 bears at its free end a bead-like bulge 9 which has a circular cross section and is arranged essentially symmetrical to the arm 3 so that an edge 7, 8 is formed between this bulge 9 and each of the two sides of the arm 3.

In the same way, the longer arm 4 bears at its end a bulge 11 having a circular cross section which is, however, in this case offset to the side such that an edge 10 is formed only between the inner surface 6 and the bulge 11 but not on the opposite surface 12 of the arm 4. This opposite surface 12 of the arm 4, which is arranged in FIG. 2 on the underside of the extruded profile, leads with a slight, convex curve to an expansion 13 on the underside of the web 2 and limited in cross section in the shape of a circular arc, the surface 12 opening into the expansion 13 approximately at right angles. At this point, an approximately right-angled edge 14 is therefore formed. The expansion 13 is closed over an angular region of approximately 270°, in the region between the points of transition of the two surfaces 12 a region of approximately 90° of the expansion 13 is therefore open.

On the opposite side of the extruded profile 1 the shorter arms 3 form together with the upper side of the web 2 a bowl 15 which is symmetric to the center plane and extends in cross section in the region of the web 2 approximately in the shape of a circular arc.

A through channel 17 is found in the web 2 and this channel has, in the illustrated embodiment, a rectangular cross section. This saves on material, on the one hand, and, on the other hand, this web serves in the manner explained on the basis of FIG. 3 to secure this extruded profile 1 in position in a separator.

The length of the arms 3 and 4 results in a plane which is defined by the thickened end edges of the bowl 5 and extends at an angle of, for example, 25° relative to the center plane, whereby this angle can be varied.

At this point, reference is made to the fact that the drawings are not true to scale but merely serve for orientation of the essential constructional features of the separator.

As shown in FIG. 1, the separator is essentially constructed exclusively of extruded profiles 1 of the type described, whereby these extruded profiles are arranged in two groups. A first group comprises a number of extruded profiles 1, which are arranged in the same alignment in spaced relation next to one another. These extruded profiles 1 having the same orientation form an inflow opening 20 between the opposite ends of the longer arms 4 and this inflow opening is limited on both sides by the bulges 11.

In the second group, the extruded profiles 1 are arranged next to one another, turned through 180°. They form an outflow opening 21 between the ends of the longer arms 4, in a similar manner to the inflow opening 20 in the first group, and this outflow opening is likewise limited by the bulges 11. The width of the inflow opening 20 and the outflow opening 21 corresponds approximately to the width of the web 2 of the extruded profile 1.

These two groups of extruded profiles are arranged relative to one another such that the center plane of the extruded profile of one group is arranged so as to be centered with the inflow opening or outflow opening of the other group. In the inflow direction, the two groups are arranged such that the channels 17 in the webs 2 of the extruded profiles 1 of both groups are located approximately on a line.

This relative arrangement of the extruded profiles 1 results in the following flow path for the stream of air to be cleaned which will now be described in detail:

The stream of air flows in the direction of the center plane of the extruded profiles 1 against the separator, which consists of a large number of extruded profiles 1 arranged essentially in one plane next to one another and therefore forms, altogether, an essentially plate-like arrangement, the flow into which is at right angles to the plate surface.

In the region between two adjacent inflow openings 20 this stream of air impinges on the surfaces 12 of the longer arms 4 which therefore form a baffle surface 12. These baffle surfaces converge in the direction towards the expansion 13 so that the stream of air directed against the baffle surfaces 12 is directed into the expansion 13. In this respect, it passes the edge 14, which forms a break-away edge for the flow, and is subjected to turbulence in the expansion 13. This leads to a separation of at least the coarse liquid particles in the stream of air. Moreover, the stream of air is thrown back in this region and it is not possible for it to pass through the separator in this region.

On the other hand, a stream of air can pass through the inflow opening 20 first of all in the direction of the center plane of the extruded profiles, i.e. in the inflow direction. This stream of air passes into the bowl 15 of the extruded profile 1 of the second group which faces the inflow opening 20, whereby the bowl 15 forms an additional baffle surface 23. The stream of air is divided at this baffle surface 23 and diverted through at least 90° to the left and to the right. This leads to a coarse separation of the liquid particles carried along.

Following this deflection by the baffle surface 23, the stream of air is directed by this baffle surface 23, on the one hand, and by the opposite inner surface 6 of the adjacent extruded profile, which forms an inflow-side deflecting surface 24, towards an inlet gap 25 which is formed between this inflow-side deflecting surface 24, on the one hand, and the bulge 9 at the end of the bowl 15 of the adjacent extruded profile, on the other hand. Upstream of the inlet gap 25 the inflow-side deflecting surface 24 and the baffle surface 23 converge. The width of the inlet gap 25 is approximately half the width of the inflow opening 20 so that the stream of air passes through the inflow opening and the inlet gap 25 at approximately the same velocity whereas in the enlarged turbulence area located therebetween a reduction in the flow-velocity occurs.

The inflow-side deflecting surface 24 directs the stream of air through the inlet gap 25 into a turbulence chamber 26 which is limited, on the one hand, by the increasingly curved region of the inflow-side deflecting surface 24 and, on the other hand, by the corresponding region of an outflow-side deflecting surface 27 which is formed by the inner surface 6 of the bowl 5 of the adjacent extruded profile 1 of the second group. This turbulence chamber 26 is therefore limited by the inflow-side deflecting surface 24 of the one extruded profile and the outflow-side deflecting surface 27 of the other extruded profile such that an essentially circular cross-sectional area results. The turbulence chamber 26 is open in the region of the inlet gap 25 and in the region of a corresponding outlet gap 28 which results between the outflow-side deflecting surface 27, on the one hand, and the bulge 9 on the inflow-side deflecting surface 24 of the other extruded profile, on the other hand.

The inflow-side deflecting surface 24 forces the stream of air entering the turbulence chamber 26 onto a path which becomes increasingly more curved and generates in the turbulence chamber 26 a strong voracity in the air passing therethrough so that in this region an extremely effective separation takes place of the liquid particles carried along. This separation is promoted, in particular, by the edges 7 between the two deflecting surfaces 24 and 27, on the one hand, and the bulges 9, on the other hand.

Following the turbulence in the turbulence chamber 26, the stream of air leaves this through the outlet gap 28, the width of which is the same as that of the inlet gap 25, and is guided along the outflow-side deflecting surface 27, the curvature of which decreases in the outflow direction, into a turbulence area 29. This turbulence area is limited, on the one hand, by the end region of the outflow-side deflecting surfaces 27 of adjacent extruded profiles 1 of the second group and, on the other hand, by the bowl 15 of an extruded profile 1 of the first group. Two streams of air enter this turbulence area 29 from opposite sides. These streams of air impinge frontally on one another in the turbulence area 29 and are hereby mixed together particularly intensively. An extremely thorough, fine separation of the liquid particles still remaining in the stream of air therefore takes place in the turbulence area 29, whereby this effect is augmented still further by the deflection of the streams of air. These streams of air are, for example, deflected outwardly in the direction towards the outflow opening 21 through approximately 90° and then leave the separator through the outflow opening 21 parallel to the inflow direction but laterally offset thereto.

The width of the outflow opening corresponds to the width of the inflow opening.

In the arrangement described, turbulence chambers 26 formed between adjacent extruded profiles of the first and the second groups are arranged next to one another essentially in one plane, whereby the turbulence chambers 26 are separated from one another only by the webs 2 of the extruded profiles 1. This results in a very compact arrangement of the separator since active separating zones are arranged within the slightest volume. The compactness is also aided by the fact that the bowls 5 which form the turbulence chambers 26 and are located opposite one another are not arranged parallel to the areal extension of the separator but at an angle thereto. This results from the fact that the planes defined by the end edges of the bowls 5 form between them an angle of, for example, 25° to 60° relative to the center plane of an extruded profile 1, i.e. relative to the throughflow direction. This results in an essentially V-shaped throughflow through the separator element.

In the turbulence chamber 26, which forms the central separation region, the stream of air is slowed down to a considerable extent due to the enlargement of the flow cross section. For example, the diameter of the turbulence chamber 26 can be four to six times as great as the width of the inlet gap and outlet gap, respectively. This leads to considerable alterations in the velocity of the stream of air and, therefore, to a very thorough separation.

The extruded profiles of each group are held together in a frame or support. For example, all the extruded profiles 1 of one group can rest with their end faces on a mounting plate 30 (FIG. 3), in which bendable tongues 31 are punched out towards the inside. These tongues 31 engage in the channels 17 in the webs of the extruded profiles and thus secure these in position between mounting plates at both end faces of the extruded profiles.

Each group of extruded profiles preliminarily mounted in this way can then be combined with the other respective group to form a separator. For this purpose, the two groups are merely turned through 180° respectively and guided towards one another in a laterally offset manner so that the extruded profiles of one group can be inserted between the extruded profiles of the other group, as clearly shown in the illustration of FIG. 1. The distances between the two groups can be adjusted as required and for cleaning the separator can be dismantled in the simplest manner by detaching the two groups from one another again.

I claim:

1. A plate separator with a transverse throughflow for separating liquids out of a stream of gas, comprising:
    a plurality of pairs of curved deflecting surfaces, each having a width, said curved deflecting surfaces located opposite one another and having respective concave sides arranged so as to be laterally offset and facing one another,
    said pairs of curved deflecting surfaces forming therebetween a single common turbulence chamber having an inlet gap and an outlet gap,
    said pairs of curved deflecting surfaces including an inflow-side deflecting surface having a curvature increasing in the direction of flow, and including an outflow-side deflecting surface having a curvature decreasing in the direction of flow,
    wherein the inflow-side and outflow-side deflecting surfaces forming the turbulence chamber are offset relative to one another by a maximum of half the width of the curved deflecting surface.

2. A separator as defined in claim 1, wherein the curvature of a portion of the inflow-side deflecting surface located distal to said inlet gap is in the shape of a circular arc.

3. A separator as defined in claim 2, wherein the curvature of a portion of the outflow-side deflecting surface located adjacent to said inlet gap is in the shape of a circular arc.

4. A separator as defined in claim 1, wherein the turbulence chamber has essentially a circular cross section.

5. A separator as defined in claim 4, wherein a diameter of the turbulence chamber is four to six times as large as a width of the inlet gap.

6. A separator as defined in claim 1, wherein:
    the inflow-side deflecting surfaces include inflow-side edges; and
    adjacent pairs of inflow-side edges define an inflow opening therebetween for entry of a stream of air to be cleaned essentially at a right angle to the inflow-side deflecting surface.

7. A separator as defined in claim 6, wherein pairs of inflow-side and outflow-side deflecting surfaces are arranged next to one another and in mirror symmetry to a center axis of the stream of air entering through the inflow opening.

8. A separator as defined in claim 7, wherein a width of the inflow opening is essentially twice as large as a width of the inlet gap into the turbulence chamber.

9. A separator as defined in claim 7, wherein:
    the outflow-side deflecting surfaces include inflow-side edges; and
    a concave baffle surface is defined between the inflow-side edges of the outflow-side deflecting surfaces transversely to the inflow direction of the stream of air entering through the inflow opening.

10. A separator as defined in claim 9, wherein the concave baffle surface is wider than of the inflow opening.

11. A separator as defined in claim 6, wherein:
    a plurality of baffle surfaces are interspersed between adjacent inflow openings, said baffle surfaces each converging in the direction of the stream of air to be cleaned.

12. A separator as defined in claim 11, wherein each of the baffle surfaces opens into an enlarged baffle chamber and forms an edge.

13. A separator as defined in claim 1, wherein:
    The outflow-side deflecting surfaces including outflow-side edges; and
    adjacent pairs of outflow-side edges of the outflow-side deflecting surfaces define an outflow opening therebetween to allow a stream of air to exit at essentially right angles to the outflow-side edges.

14. A separator as defined in claim 13, wherein:
    a turbulence area is located in front of the outflow opening and is formed by the outflow-side edges of two adjacent outflow-side deflecting surfaces, and an end wall which is defined between two adjacent outflow-side edges of two adjacent inflow-side deflecting surfaces, said outflow-side deflecting surfaces being arranged in mirror image to one another.

15. A separator as defined in claim 14, wherein the end wall is concave in design towards the turbulence area.

16. A separator as defined in claim 14, wherein the end wall is wider than the outflow opening.

17. A separator as defined in claim 14, wherein:
each outlet gap opens into a respective turbulence area such that the stream of air exiting from the outlet gap of one turbulence chamber impinges frontally upon a stream of air entering the turbulence area through an oppositely located outlet gap of an adjacent turbulence chamber.

18. A separator as defined in claim 1, wherein:
said inflow-side deflecting surfaces include inflow-side edges having bulges; and
said outflow-side deflecting surfaces include outflow-side edges having bulges.

19. A separator defined in claim 1, wherein:
said inflow-side deflecting surfaces include outflow-side edges having bulges;
said outflow-side deflecting surfaces include inflow-side edges having bulges;
each of said inflow-side deflecting surfaces and outflow-side deflecting surfaces includes inner and outer sides; and
the bulges extend from each of said inner and outer sides.

20. A separator as defined in claim 18, wherein:
said inflow-side deflecting surfaces and said outflow-side deflecting surfaces include inner sides; and
the bulges are formed only one each of said inner sides.

21. A separator as defined in claim 1, wherein two adjacent inflow-side deflecting surfaces are connected with one another by a web forming a first component.

22. A separator as defined in claim 21, wherein two adjacent outflow-side deflecting surfaces are connected with one another by a web forming a second component.

23. A separator as defined in claim 22, wherein: said first and second components are substantially identical in shape and offset laterally, wherein every other component is rotated at 180° with respect to a prior component.

24. A separator as defined in claim 23, wherein:
said inflow-side deflecting surfaces include outer sides; and
the outer sides of the inflow-side deflecting surfaces form baffle surfaces between adjacent inflow-side deflecting surfaces.

25. A separator as defined in claim 23, wherein:
said outflow-side deflecting surfaces include outer sides; and
the outer sides of adjacent outflow-side deflecting surfaces form between the area of increasing curvature a baffle surface arranged transversely to an inflowing stream of air via said inlet gap and an outflowing stream of air via said outlet gap.

26. A separator as defined in claim 23, wherein each of the components comprises an integral longitudinal profile.

27. A separator as defined in claim 26, wherein the longitudinal profile has a generally X-shaped cross section with arms forming the deflecting surfaces.

28. A separator as defined in claim 27, wherein the arms on one side of the longitudinal profile are shorter than the arms on the other side.

29. A separator as defined in claim 23, wherein:
at least one channel opening is arranged in the web; and
a holding projection of a lateral frame member engages the channel opening.

30. A separator as defined in claim 1, wherein:
each of said concave sides of said outflow-side deflecting surfaces include two end points having a first plane passing through said two end points;
two adjacent outflow-side deflecting surfaces are connected by a web; and
said first plane forms an angle of between 20° and 60° respect to a second plane bisecting said web between said two adjacent outflow-side deflecting surfaces.

31. A separator as defined in claim 30, wherein:
said two adjacent outflow-side deflecting surfaces are arranged in a mirror image relationship about said second plane.

32. A separator as defined in claim 1, wherein:
an inflow-side end of each of the inflow-side deflecting surfaces is tangential with a first plane;
an outflow-side end of each of the outflow-side deflecting surfaces is tangential with a second plane; and
said first and second planes are constructed and arranged from being parallel to intersecting to form an obtuse angle of no less than 120°.

* * * * *